US012425339B2

(12) United States Patent
Györgyi et al.

(10) Patent No.: US 12,425,339 B2
(45) Date of Patent: Sep. 23, 2025

(54) METHOD FOR DEBUGGING THE PARSER IN PROGRAMMABLE ROUTERS

(71) Applicant: Telefonaktiebolaget LM Ericsson (publ), Stockholm (SE)

(72) Inventors: Csaba Györgyi, Nyfregyhaza (HU); Sandor Laki, Budapest (HU); Gergely Pongrácz, Budapest (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 582 days.

(21) Appl. No.: 17/753,173

(22) PCT Filed: Sep. 4, 2019

(86) PCT No.: PCT/IB2019/057458
§ 371 (c)(1),
(2) Date: Feb. 22, 2022

(87) PCT Pub. No.: WO2021/044191
PCT Pub. Date: Mar. 11, 2021

(65) Prior Publication Data
US 2022/0278930 A1    Sep. 1, 2022

(51) Int. Cl.
*H04L 45/74*    (2022.01)
*H04L 43/10*    (2022.01)
(52) U.S. Cl.
CPC .............. *H04L 45/74* (2013.01); *H04L 43/10* (2013.01)

(58) Field of Classification Search
USPC ....................................................... 370/392
See application file for complete search history.

(56) References Cited

U.S. PATENT DOCUMENTS

2004/0250164 A1\* 12/2004 Ahmad ................. G06F 11/364
714/E11.214
2013/0275606 A1\* 10/2013 Lyer ........................ H04L 61/45
709/230

(Continued)

FOREIGN PATENT DOCUMENTS

CN    107911264 A    4/2018
EP    2646918 B1    3/2017

(Continued)

OTHER PUBLICATIONS

International Search Report and Written Opinion for Application No. PCT/IB2019/057458, dated May 18, 2020, 12 pages.

(Continued)

*Primary Examiner* — Ayman A Abaza
*Assistant Examiner* — Hooman Houshmand
(74) *Attorney, Agent, or Firm* — Nicholson De Vos Webster & Elliott LLP

(57) ABSTRACT

A method is implemented by a programmable network device, where the method is to enable debugging of a parser in a packet processing pipeline of the programmable network device. The method includes receiving a packet for processing in the packet processing pipeline, initializing a tracing structure to record debugging information for the parser, adding a current state of the parser to the tracing structure, and determining a next state of the parser.

20 Claims, 7 Drawing Sheets

(56) References Cited

U.S. PATENT DOCUMENTS

| | | | |
|---|---|---|---|
| 2015/0156288 A1* | 6/2015 | Lu | H04L 69/22 370/392 |
| 2019/0166143 A1* | 5/2019 | Kim | H04L 41/40 |
| 2019/0394086 A1* | 12/2019 | Gasparakis | H04L 41/082 |
| 2020/0021512 A1* | 1/2020 | Naskar | H04L 43/50 |

FOREIGN PATENT DOCUMENTS

| | | |
|---|---|---|
| WO | 2006017689 A2 | 2/2006 |
| WO | 2012075260 A1 | 6/2012 |

OTHER PUBLICATIONS

Glen Gibb et al., "Design Principles for Packet Parsers," 2013, pp. 13-24, IEEE.

* cited by examiner

METHOD FOR DEBUGGING THE PARSER IN PROGRAMMABLE ROUTERS

CROSS-REFERENCE TO RELATED APPLICATIONS

This application is a National stage of International Application No. PCT/IB2019/057458, filed Sep. 4, 2019, which is hereby incorporated by reference.

TECHNICAL FIELD

Embodiments of the invention relate to the field of programmable routers; and more specifically, to debugging parsers in packet processing pipelines of programmable routers.

BACKGROUND ART

Computer networks and network devices are complex. Having tools to debug and problem solve issues with relation to these technologies improves the operational reliability and function of these technologies. There are many issues in computer networking that are difficult to diagnose and resolve at the speed that traffic flows through the network devices, because there isn't diagnostic support directly implemented in the network devices to analyze the data traffic or to act on the traffic as it arrives. Next-generation switch hardware and software, e.g., programmable routers, can change how the network and devices function without having to replace the hardware equipment inside the network.

Network devices can handle many functions other than basic data traffic forwarding. Examples of such functions include low latency calculations on the application level that are processed at network device during communication. Such application level functions include handling real time closed control loops, which is an important use case for robotics. One of the most challenging issues related to networked robotics is to fulfill the reliability and safety requirements of a robot cell control when some control functionalities are deployed in a cloud computing environment and connected to the robot cell using wireless technology. Over a wireless connection, the commands of a robot cell controller can be delayed or lost that can result in unwanted/unsafe situation.

Robotic arm vendors utilize custom application programming interfaces (APIs) to access the command functions of the robot. The usual way of communication between the robot and an external controller is sending status messages from the robot to the controller, and control messages from the controller to the robot. The status messages have a fixed structure, containing information of positions in joint and Cartesian space, temperature of the servos, consumed energy, and similar information. The command message formats are dependent on the way the robot is controlled: a) position b) velocity c) effort, or d) some hybrid.

A programmable router that performs robotic arm related functions performs a complex parsing of the command and status messages, employs a valid calculation and does the formatting of the packets. As a result, the programmable router and the supporting functions becomes complex and difficult to debug, which undermines the implementation of these application level support functions in the programmable router.

SUMMARY

In one embodiment, a method is implemented by a programmable network device, where the method is to enable debugging of a parser in a packet processing pipeline of the programmable network device. The method includes receiving a packet for processing in the packet processing pipeline, initializing a tracing structure to record debugging information for the parser, adding a current state of the parser to the tracing structure, and determining a next state of the parser.

In another embodiment, a network device is configured to execute the method to enable debugging of a parser in a packet processing pipeline of the programmable network device. The network device includes a non-transitory computer readable medium having stored therein a parser debugger, and a processor coupled to the non-transitory computer readable medium, the processor to execute the parser debugger, the parser debugger to receive a packet for processing in the packet processing pipeline, to initializing a tracing structure to record debugging information for the parser, to add a current state of the parser to the tracing structure, and to determine a next state of the parser.

In a further embodiment, a computing device implements a plurality of virtual machines, the plurality of virtual machines to implement network function virtualization (NFV), where at least one virtual machine from the plurality of virtual machines implements the method to enable debugging of a parser in a packet processing pipeline of the programmable network device. The computing device includes a non-transitory computer readable medium having stored therein a parser debugger, and a processor coupled to the non-transitory computer readable medium, the processor to execute at least one of the plurality of virtual machines, the virtual machine to execute the parser debugger to receive a packet for processing in the packet processing pipeline, to initializing a tracing structure to record debugging information for the parser, to add a current state of the parser to the tracing structure, and to determine a next state of the parser.

In one embodiment, a control plane device is in communication with a plurality of data plane nodes in a software defined networking (SDN) network. The control plane device implements the method of configuring a parser debugger. The control plane device includes a non-transitory computer readable medium having stored therein a parser debugger controller or analyzer, and a processor coupled to the non-transitory computer readable medium, the processor to execute the parser debugger controller or analyzer, the parser debugger controller or analyzer to send configuration information to the parser debugger, and to receive a report from a parser debugger including a tracing structure having therein debugging information for the parser.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
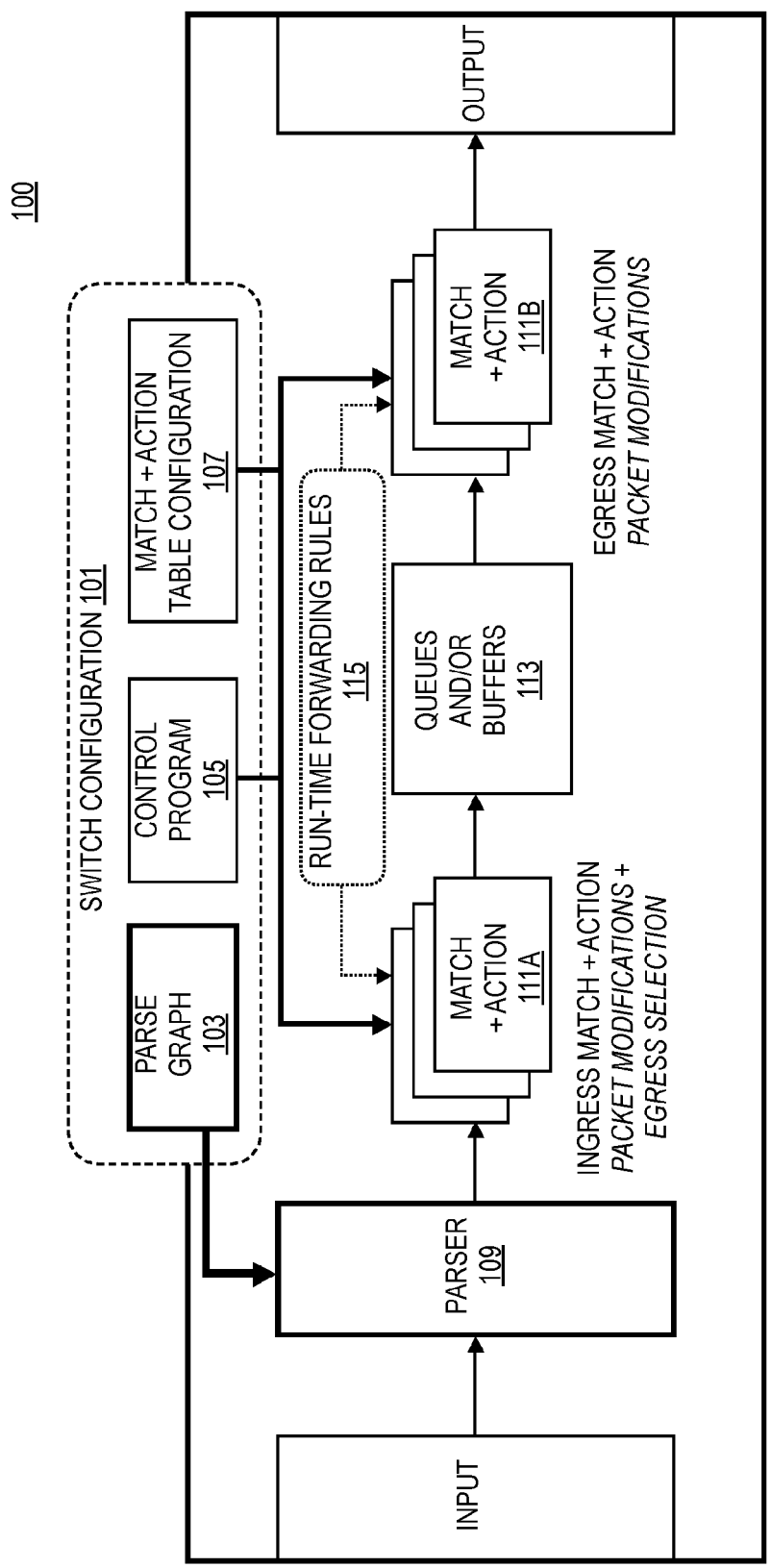
FIG. 1 is a diagram of one embodiment of a packet processing pipeline with a debuggable parser.

The following description describes methods and apparatus for enabling debugging within a parser of a programmable router. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Network devices, such as programmable routers, include a packet forwarding pipeline that can be programmed using specialized languages such as the P4 programming language, by the P4 Language Consortium. The programming language works in connection with control protocols such as software defined networking (SDN) control protocols such as OpenFlow. SDN provides programmatic control over networks and network devices. Programming languages for the operation of the programmable switch, such as P4, provide reconfigurability, protocol independence, and target independence. The programmable routers and similar network devices can include Ethernet switches, load balancers, routers, and similar devices.

FIG. 1 is a diagram of one embodiment of a packet processing pipeline with a debuggable parser. The packet processing pipeline 100 is controlled by a switch configuration 101 that is managed by the control plane protocol. The switch configuration 101 can be managed using a flow control protocol such as OpenFlow by a controller such as an SDN controller. The switch configuration defines supported protocols and forwarding rules. The switch configuration can also update match action tables, which can be utilized to implement various forwarding operations and policies.

The switch configuration can include a parse graph 103, control program 105, and match-action table configuration 107. The parse graph 103 is a directed acyclic graph that specifies the order and contents of the packet headers to be processed. Each edge of the parse graph 103 can be associated with a predicate that defines the conditions where the edge is taken. The parse graph 103 is utilized by the parser 109 to process incoming packets, as described further herein. The parse graph 103 can have any number of nodes and edges.

The control program 105 is a data structure or process that specifies a table type for each match action table including a name and description of allowed contents for the entries. The control program 105 also specifies how packets are to be processed in terms of the order and conditions of the match action tables that are applied to the packets. The match-action table configuration 107 includes data to be populated to the match action tables 111A and 111B. The match-action table configuration 107 can include match-action table entries to be stored in the match-action tables 111A and 111B or data to update or delete existing match-action table entries. This information, the parse graph 103, control program 105, and match-action table configuration 107 can be updated or otherwise modified by a controller such as an SDN controller using a control plane protocol.

The packet processing pipeline 100 acts on packet received via an input such an input port of the programmable switch. The packet processing pipeline 100 parses the incoming packets in a parser 109. The parser 109 detects and examines fields from the header of each received packet in accordance with the parse graph 103 (i.e., the fields are detected in a sequence defined by the parse graph 103). The sequence of identifying the fields in the header operates as a state machine where the state machine transitions between states in response to the header field detection sequence following the parse graph 103. The identified fields are then applied to the match-action tables 111A and 111B, which can be divided into ingress match-action tables 111A and egress match-action tables 111B. The packets that are being forwarded across match-action tables 111A and 111B can be stored or queued in a set of internal queues and/or buffers 113 while awaiting further processing in the match-action tables 111A and 111B. Any number or configuration of queues and/or buffers 113 can be present in the packet processing pipeline 100. The run-time forwarding rules 115 in some embodiments provide additional control or configuration of the match-action tables 111A and 111B to for example implement policies, load-balancing, and similar mechanisms in the packet processing pipeline 100. After processing by the match-action tables 111A and 111B the packets are output to an output port of the programmable switch or similarly forwarded toward a local or remote destination as determined by the match-action tables 111A and 111B.

The embodiments address a problem in the operation of programmable switch, specifically, the embodiments provide a debugging mechanism that includes the parser 109. Existing programmable switches do not provide a mechanism to debug the packet processing pipeline 100 specifically the parser 109, because they do not provide a mechanism to trace the operation of the parser 109 as it processes a given input packet.

The embodiments overcome the issues of the prior art by providing automated debugging method for the parsers of programmable switch. The embodiments provide a method and mechanism for enabling a trace of parsing states and collection of additional information like values of relevant packet fields. The collected information can then be used in the data plane or sent to the control plane for further analysis.

The embodiments provide advantages over the prior art including, enabling the debugging of the parser, and collecting stateful information on the parsing logic, including the sequence of states and decisions. The embodiments operate with a small computational and memory overhead and low implementation complexity, which enable the use of the embodiments without significantly impacting the other operations of the programmable switch. In some embodiments, the parsing debugging can be implemented in P4 with using a basic set of rules. Using the basic rules of the embodiments any P4 program can automatically be extended with parser debugging elements by rewriting the relevant logic.

The embodiments provide a lightweight method for debugging programmable parser components of programmable switch data planes, e.g., those programmed using P4. In these programmable switches, the parsing logic of the parser 109 operates as a state machine where in each state a header instance is first extracted and then the packet is either accepted/rejected or a transition to a next state is applied. The transition can be unconditional or conditional based on the actual value of a header field. If the packet is accepted by the parser 109, the packet processing pipeline starts (e.g., at the ingress match-action table 111A). Existing programmable switch data planes, e.g., implemented with P4, provide very limited mechanisms in the parser to trace the process (i.e., there are no registers, counters, extern/complex functions, or similar support mechanisms for tracing). The embodiments provide debugging without adding only the use of a few additional metadata fields that are utilized in a stateless way. The embodiments encompass at least two variants of a programmable parser debugging method, first tracing the parsing states only and second tracing the parsing states and decision logic.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
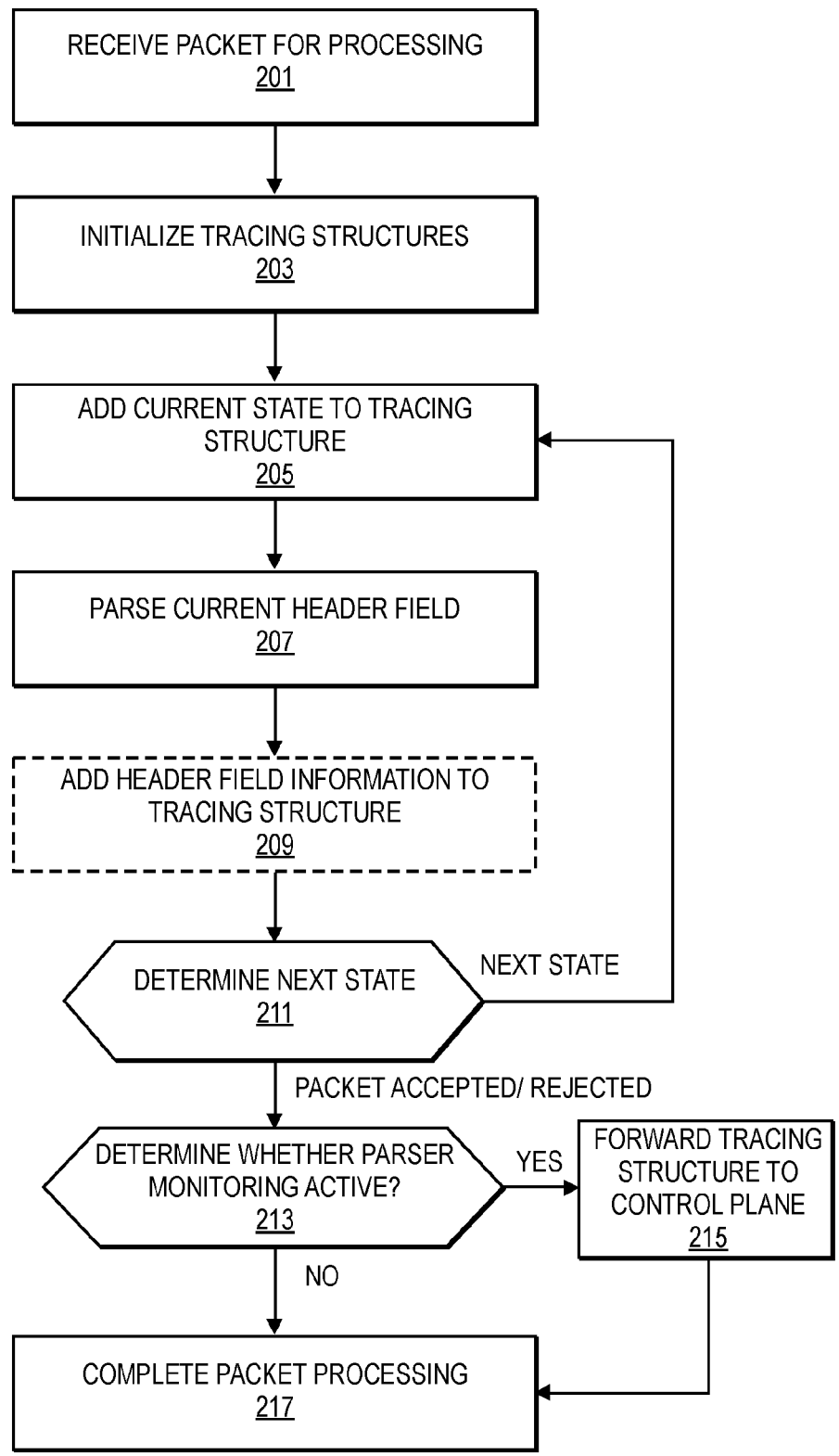
FIG. 2 is a diagram of one embodiment of a parser tracing process for debugging the parser in a programmable switch.

FIG. 2 is a diagram of one embodiment of a parser tracing process for debugging the parser in a programmable switch. The process of parser tracing is described herein with relation to FIG. 2 as a general process. Further example implementations are described with relation to FIGS. 3 and 4.

The parser tracing process can be configured by a controller or administrator via control plane protocols. In some embodiments, the parser tracing process executes when the parser is configured for monitoring. In other embodiments, the parser tracing process executes with each packet processed by the parser and the packet processing pipeline. Where the parser tracing process is continuous, then the control plane can configure reporting of the tracing process information.

In some embodiments, the parser tracing process can be embedded in the operation of the parser or separately implemented as a discrete process. In other embodiments, the parser tracing process is embedded into the operation of the parser. In either case, the parser tracing process is described herein as being implemented by a parser debugger.

The parser tracing process can be initiated in response to receiving a packet for processing (Block 201). The packet header is processed by the parser. The body of the packet may be separately stored or handled within the packet processing pipeline. The parser tracing process initiates a tracing structure specific to the received packet (Block 203). The tracing structure is a data structure that tracks the states of the parse graph that are traversed during the processing of the received packet as well as additional related information. The tracing structure can have any number of fields and have any structure. The tracing structure can be a set of separate fields, a list, an array, or similar data structure. The tracing structure can be initialized to starting values or similarly cleared to prepare the tracing structure for tracking the states of the parse graph traversed by the parser during the processing of the received packet header.

The parser starts in an initial state of the configured parse graph, which is added to the tracing structure as a first traversed state of the parser (Block 205). The state can be added to the tracing structure as a name, identifier, or similar indicator of the state of the parser. The state information can be added in any format or form compatible with a format of the tracing structure, e.g., by adding an identifier to a tail of a list of traversed identifiers in the tracing structure. The parser then parses (i.e., identifies a type and/or value) of the current header field (Block 207). This information is utilized by the parser to determine a next state (i.e., a next node in the parse graph) based on the parser logic and the determined value. In some embodiments, some or all of the header field information is also added to the tracing structure (Block 209). The parser tracing process can be configured to track this additional information in some embodiments. In further embodiments, any type or number of header value information can be configured to be tracked during the parser tracing process. A controller can manage the enablement or disablement of header value information tracking, as well as specify, the cases where the header value information is tracked.

The parser determines a next stage of the parser graph based on the header value information and whether additional fields of the header remain to be processed (Block 211). In some cases, the packet header has been found to be invalid (e.g., having invalid header information or structure). In other cases, the packet header processing completes and the packet is accepted to be applied to the packet processing pipeline (e.g., the header values are applied to the match-action tables). In these cases, where the packet header is accepted or rejected, then the parser operation completes and the packet is then processed by the packet processing pipeline. If additional header fields remain to be processed, then the state of the parser transitions and the parser tracing process continues to add the new current state to the tracing structure (Block 205). The processing of the packet header continues until it is accepted or rejected at Block 211.

After the packet header has been accepted or rejected at Block 211, then the packet processing pipeline (e.g., the match-action tables) are applied to the packet. During this further packet processing pipeline process a determination is made whether the parser monitoring (i.e., debugging process) is active (Block 213). This can be configured by the control plane in the match-action tables such that when the parser monitoring is active, a match-action table entry is configured to forward a copy of the tracing structure for the packet to the control plane (i.e., to the controller) (Block 215). After a copy of the tracing structure packet is forwarded to the control plane or in cases where the parser monitoring is not active, the packet processing then completes according to the header values and match-action table configuration of the packet processing pipeline of the programmable switch.

Figure 3:
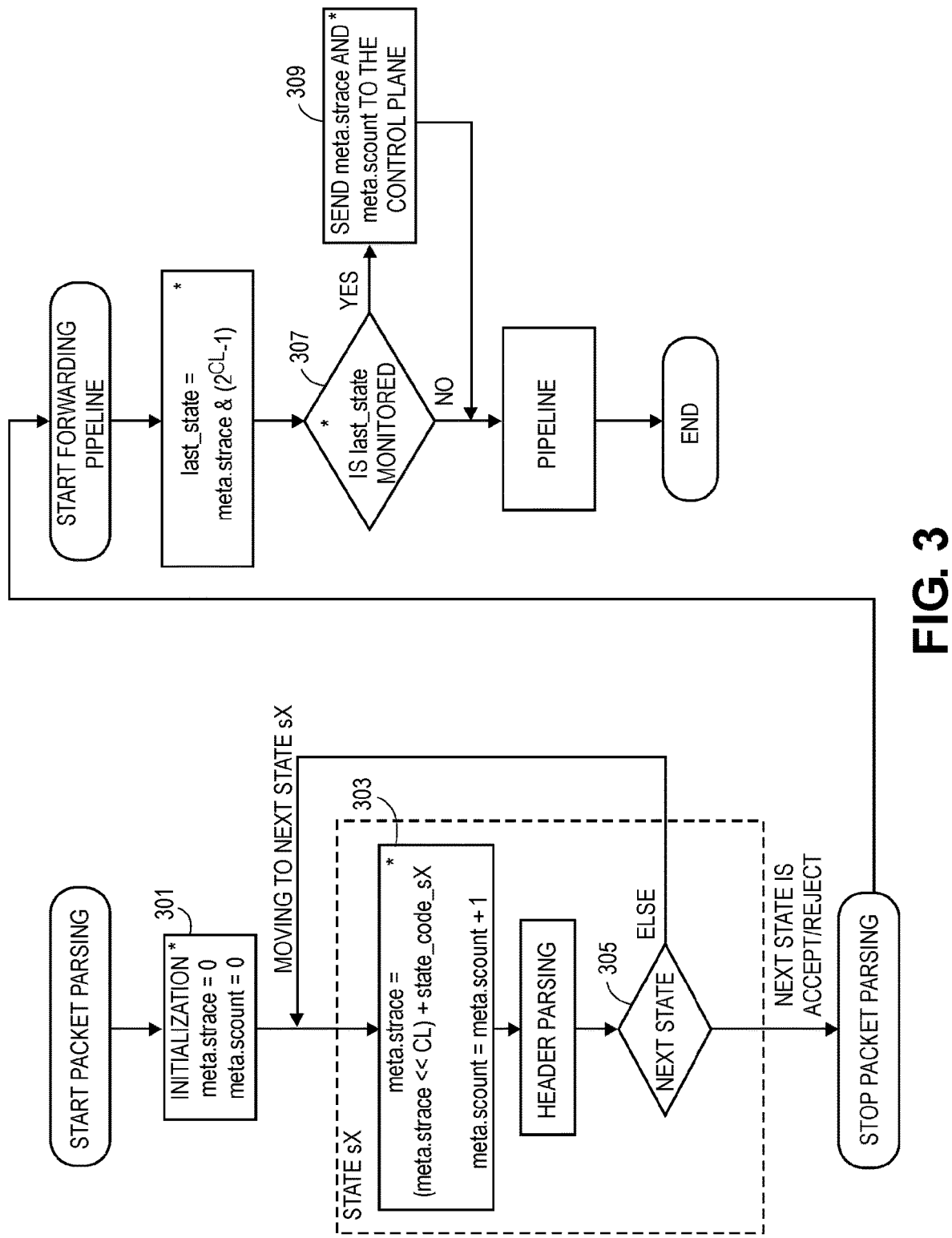
FIG. 3 is a diagram of one example implementation of a parser tracing process where parsing states are tracked.

FIG. 3 is a diagram of one example implementation of a parser tracing process where parsing states are tracked. As with the general parsing tracing process, the main goal of this example implementation is to collect the chain of parser states (i.e., the header types) that the received packet goes through. The parser state information can be collected without information on the decision logic.

In this example implementation, each parser state is assigned a unique, non-zero identifier described in a static bit-width referred to as CL (e.g., an 8 bit width). For a given state sX, its identifier is denoted by state_code_sX>0. In this example implementation, zero has a special role in the parser tracing process, representing empty, i.e., no state. The sequence of states is stored in a continuous area of the memory, representing a metadata field referred to as meta.strace whose bit width can be long enough to store all of the collected state identifiers (e.g., if the identifiers are 8 bits, a metadata field of 64-bits can capture the last 8 states of the parser). The size of the metadata field can be selected based on the number of states to be tracked (e.g., the size can be selected to collect the bottom most 8 header types of the header stack). Another metadata field meta.scount is the number of states that have been traversed or collected in the meta.strace metadata field. The initial values of both of these metadata fields are zero after initialization (Block 301). If the bit-width of metadata fields are limited by the architecture/hardware, then the meta.strace can be represented as multiple metadata fields and used accordingly.

In state sX, meta.strace is first shifted to the left by CL bits to make room for the new state identifier. Then the identifier state_code_sX is added to the metadata field meta.strace and meta.scount is increased by one (Block 303). This procedure is repeated after state transition (Block 305) until the packet is either accepted or rejected. After accepting or rejecting the packet, in the packet processing pipeline the parser tracing process can decide to send the debugging metadata fields (i.e., meta.strace and meta.scount) to the control plane or not (e.g. based on the last_state reached or similar criteria) (Blocks 307 and 309). The control plane can then perform further analysis on the received sequence. The controller or similar entity can utilize the meta.scount to recognize if the meta.strace was overfilled (i.e., the first part of the state sequence was missing because it was shifted out from the memory).

Figure 4:
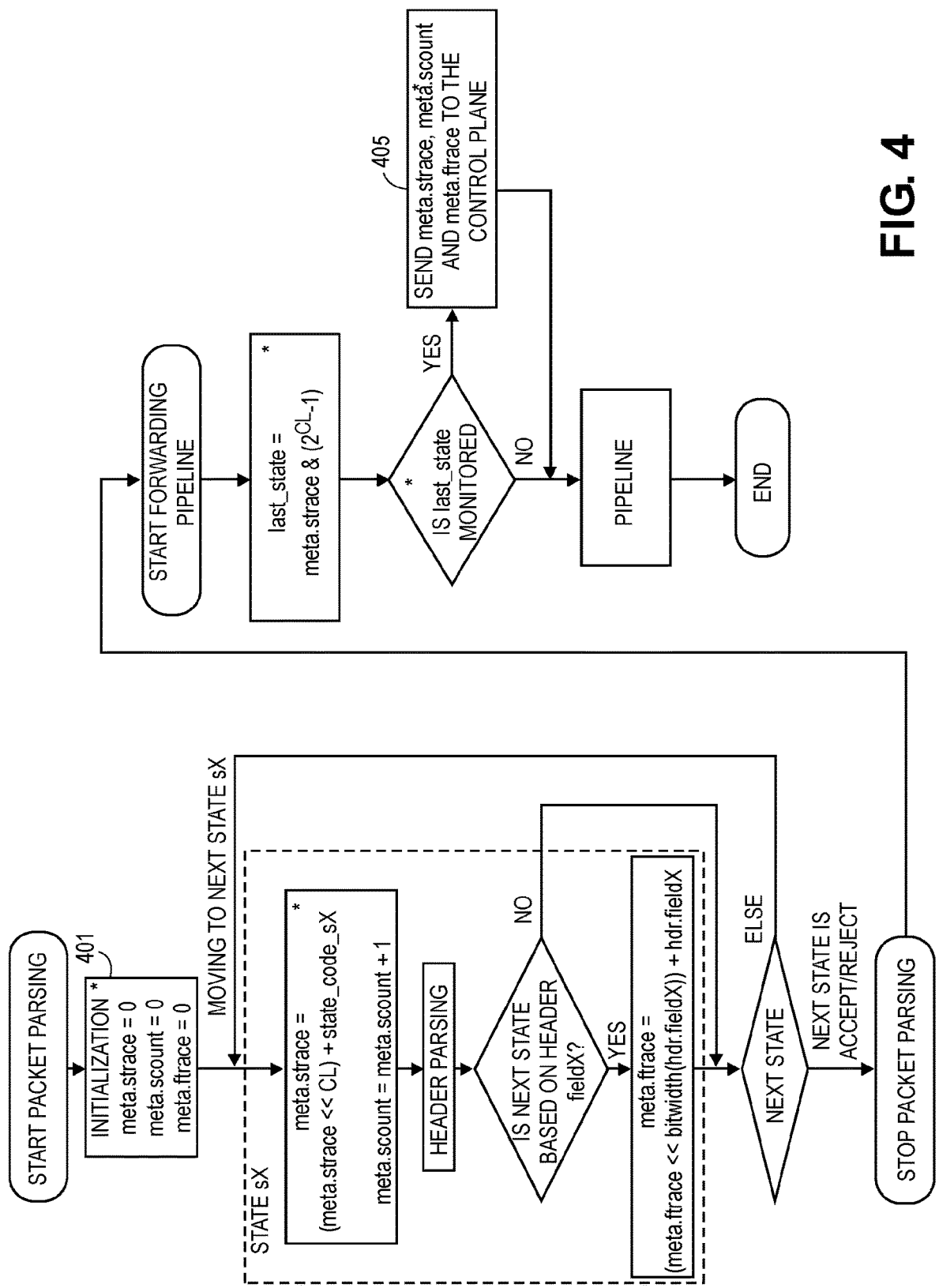
FIG. 4 is a diagram of another example implementation of a parser tracing process where parsing states are tracked.

FIG. 4 is a diagram of another example implementation of a parser tracing process where parsing states are tracked. As with the general parsing tracing process, the main goal of this example implementation is to collect the chain of parser states (i.e., the header types) that the received packet goes through. The parser state information can be collected without information on the decision logic.

The parser tracing process of FIG. 4 operates in the same manner as the parser tracing process of FIG. 3, except as detailed herein below. The parser tracing is extended in this example implementation by a mechanism to store the actual values of header fields that are applicable to the conditional state transitions of parsing logic. To this end, a metadata field meta.ftrace is utilized with a zero initial value as shown in Block 401. The bit-width of the meta.ftrace field can be selected or configure to store the sequence of header field values being used in conditional transitions. If there is no room to store all the values, the old history is shifted out of the memory. Before applying a conditional state transition in state sX, meta.ftrace is first shifted to the left by the bit-width of the header field used in the condition to make room for storing its value and filled with the actual value (Block 403). In addition to other related metadata, the meta.ftrace is also passed to the control plane for further investigation (Block 405).

In addition to the introduced metadata fields for the examples of FIGS. 3 and 4, the embodiments support sharing of additional information (e.g., other header field values, register states, and similar information) needed or useful for parser debugging. One skilled in the art would appreciate that the illustrated embodiments are provided by way of example and not by way of limitation. The principles, processes and structures can be extended to support the collection and reporting of other information consistent with the embodiments described herein.

The collected information for the parser tracing process can be utilized to determine how the parser is handling any given packet that is sent to the respective programmable switch. In further embodiments, additional data can be collected and functions implemented. For example, the last state where the parsing stops is stored at the least significant bits of meta.strace. To capture uncovered branches of the parsing graph a new state called UNKNOWN that triggers in cases when the incoming traffic is different than what the parser is prepared for can be used. If there is no default direction in conditional transitions, a transition to UNKNOWN is added. In UNKNOWN state meta.strace, meta.scount and meta.ftrace are updated as described previously.

In further embodiments, the principles and structures described herein can be applied to the automatic generation of debugging feature for P4 programs. The place of the embodiments in a P4 program or similar programmable data planes are denoted by boxes with an '*' in the upper right corner in FIGS. 3 and 4. These components can automatically be generated and added to any P4 data plane descriptions and then in such cases would only require control plane modifications to receive and process the parser debugging metadata meta.strace, meta.scount and meta.ftrace.

As set forth, the embodiments provide a method for debugging the parser in programmable router switches. The parser tracing process consists of indicating the states and transitions of the parsing graph in a custom defined bit stream modified as it is processed according to the parsing graph. The embodiments may maintain three variables as metadata fields 1) for storing the sequence of parsing states, 2) for counting the number of states the packet visited and 3) for storing the actual values of header fields taking part in the state-transition decisions. The parser tracing process indicates if the bitstream of states are overrun. Also, the parser tracing process can be automatically generated given the parsing graph.

Figure 5A:
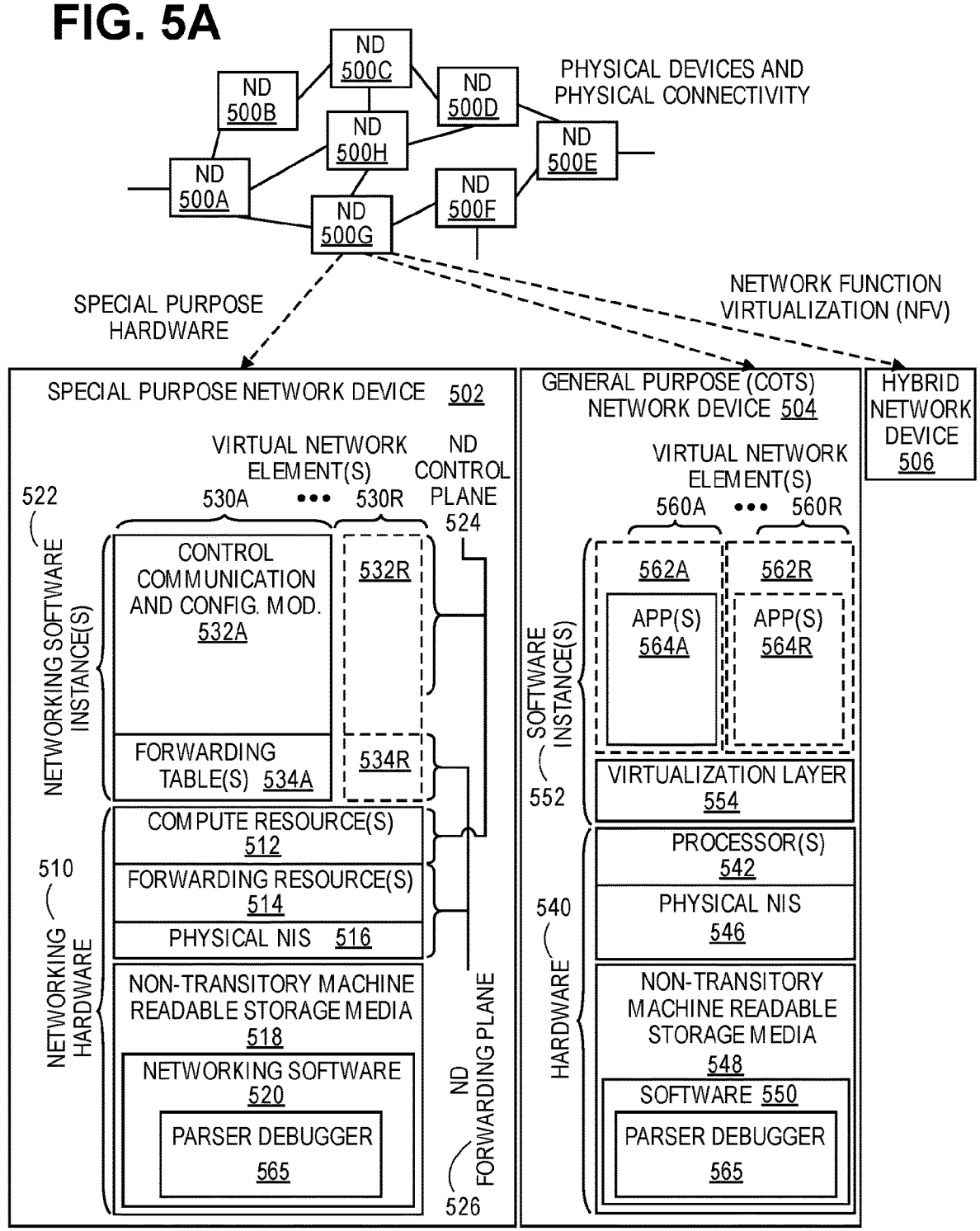
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The networking software 520 can include software that implements a packet processing pipeline as described herein including a parser and parser debugger 565. The parser debugger 565 can be integrated with or separately implemented from the parser and packet processing pipeline.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The software 550 can include software that implements a packet processing pipeline as described herein including a parser and parser debugger 565. The parser debugger 565 can be integrated with or separately implemented from the parser and packet processing pipeline.

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
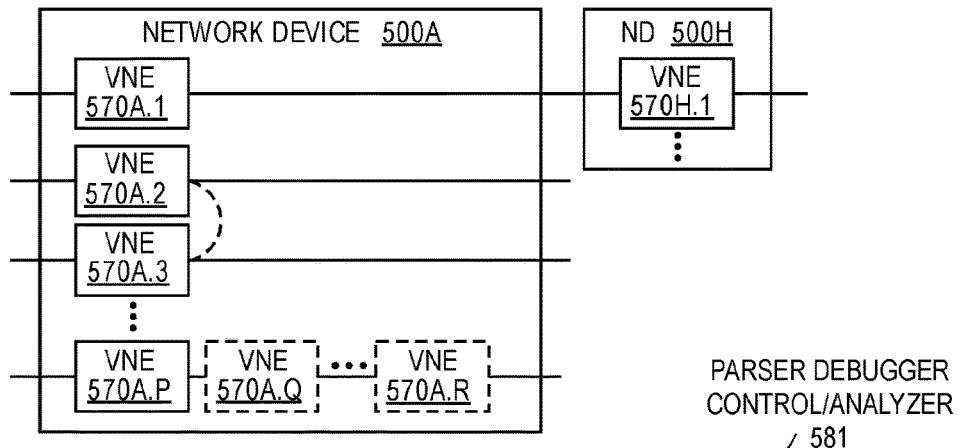
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
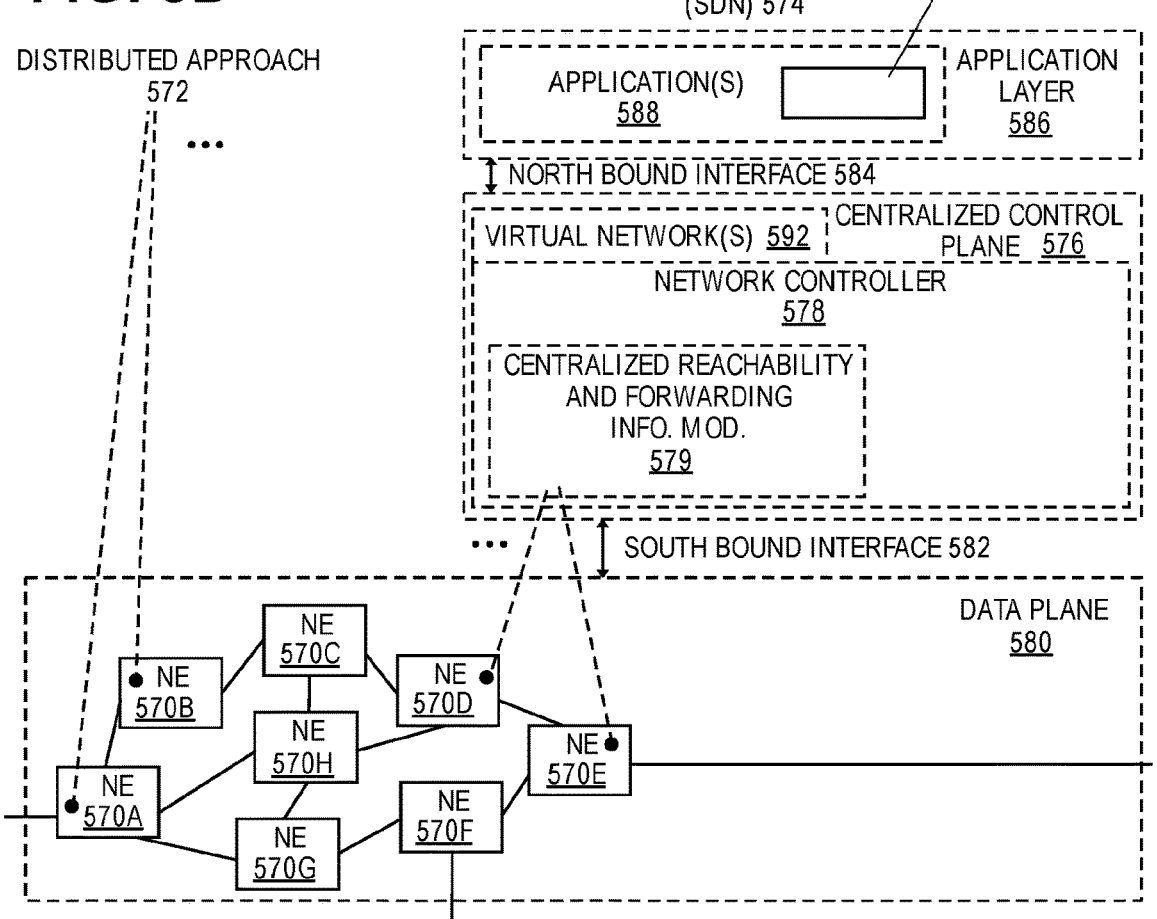
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE) Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The applications 588 can include software that implements control plane configuration and control functions including parser debugger control or analyzer 581. The parser debugger control or analyzer 581 can be integrated with or separately implemented from other control plane functions. The parser debugger control or analyzer 581 implements configuration and control functions for the parser debugger via control plane protocols. Similarly, the parser debugger control or analyzer 581 can receive reported information including tracing structures and can perform any manner of analysis on the reported information. In some embodiments, the control, configuration, and analysis functions can be implemented in separate functions and applications.

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
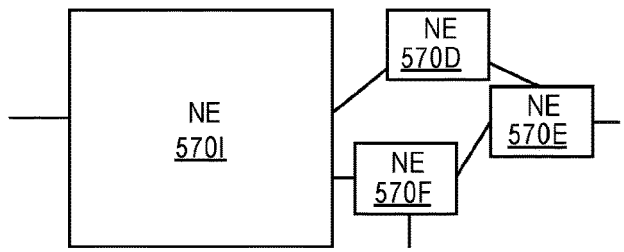
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
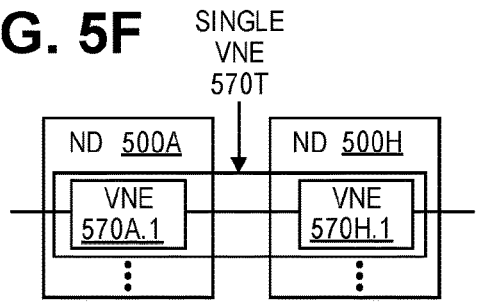
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
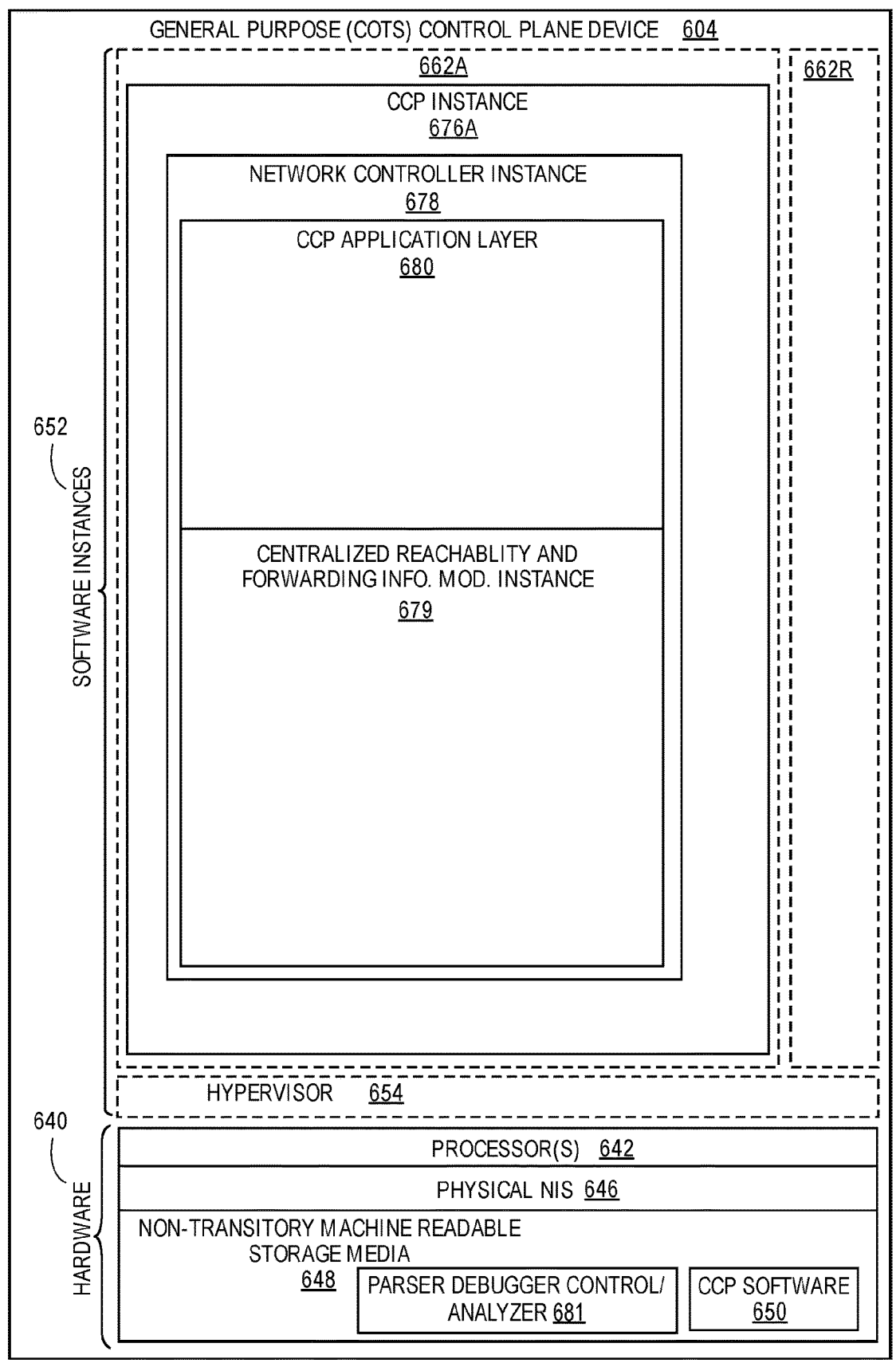
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650.

The non-transitory machine readable storage media 648 can include software that implements control plane configuration and control functions including parser debugger control or analyzer 681. The parser debugger control or analyzer 681 can be integrated with or separately implemented from other control plane functions. The parser debugger control or analyzer 681 implements configuration and control functions for the parser debugger via control plane protocols. Similarly, the parser debugger control or analyzer 581 can receive reported information including tracing structures and can perform any manner of analysis on the reported information. In some embodiments, the control, configuration, and analysis functions can be implemented in separate functions and applications.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a programmable network device, the method to enable tracing of parsing states of a parser for debugging of the parser in a packet processing pipeline of the programmable network device, the method comprising:
    receiving a packet for parsing in the packet processing pipeline;
    processing a packet header of the packet by the parser;
    initializing a tracing data structure to record states of the parser as debugging information related to the parser during parsing of the packet, in order to track states of a parse graph that are traversed during processing of the packet;
    initializing the parser to start in an initial state and recording in the tracing data structure;
    adding a current state of the parser to the tracing data structure to record the current state of the parser as a traversed state of the parser;
    parsing a current header field;
    determining a next state of the parser based on the current header field to record the next state in the tracing data structure for debugging; and
    applying the packet to the packet processing pipeline when packet header processing completes.

2. The method of claim 1, further comprising:
    adding a header field value of the current header field in the packet to the tracing data structure.

3. The method of claim 1, further comprising:
    reporting the tracing data structure to a controller in response to parser monitoring being active.

4. The method of claim 1, further comprising;
    storing a number of states traversed by the packet in the parser in the tracing data structure.

5. The method of claim 1, wherein the current state is one of a plurality of parser states in the parse graph that utilizes one of a plurality of unique identifiers to identify the current state from other parser states.

6. A network device configured to enable tracing of parsing states of a parser for debugging of the parser in a packet processing pipeline of the network device, the network device comprising:
    a computer readable storage medium having stored therein a parser debugger; and
    a processor coupled to the computer readable storage medium, in which the processor to execute the parser debugger for the network device to:
        receive a packet for parsing in the packet processing pipeline;
        process a packet header of the packet by the parser;
        initialize a tracing data structure to record states of the parser as debugging information related to the parser during parsing of the packet, in order to track states of a parse graph that are traversed during processing of the packet;
        initialize the parser to start in an initial state and recording in the tracing data structure;
        add a current state of the parser to the tracing data structure to record the current state of the parser as a traversed state of the parser;
        parse a current header field;
        determine a next state of the parser based on the current header field to record the next state in the tracing data structure for debugging; and
        apply the packet to the packet processing pipeline when packet header processing completes.

7. The network device of claim 6, wherein the parser debugger is further to add a header field value of the current header field in the packet to the tracing data structure.

8. The network device of claim 6, wherein the parser debugger is further to report the tracing data structure to a controller in response to parser monitoring being active.

9. The network device of claim 6, wherein the parser debugger is further to store a number of states traversed by the packet in the parser in the tracing data structure.

10. The network device of claim 6, wherein the current state is one of a plurality of parser states in the parse graph that utilizes one of a plurality of unique identifiers to identify the current state from other states.

11. A computing device to implement a plurality of virtual machines, the plurality of virtual machines to implement network function virtualization (NFV), where at least one virtual machine from the plurality of virtual machines enables tracing of parsing states of a parser for debugging of the parser in a packet processing pipeline of a network device, the computing device comprising:
    a computer readable storage medium having stored therein a parser debugger; and
    a processor coupled to the computer readable storage medium, in which the processor to execute at least one of the plurality of virtual machines, the at least one virtual machine to execute the parser debugger to:
        receive a packet for parsing in the packet processing pipeline;
        process a packet header of the packet by the parser;
        initialize a tracing data structure to record states of the parser as debugging information related to the parser during parsing of the packet, in order to track states of a parse graph that are traversed during processing of the packet;

initialize the parser to start in an initial state and recording in the tracing data structure;

add a current state of the parser to the tracing data structure to record the current state of the parser as a traversed state of the parser;

parse a current header field;

determine a next state of the parser based on the current header field to record the next state in the tracing data structure for debugging; and apply the packet to the packet processing pipeline when packet header processing completes.

12. The computing device of claim 11, wherein the parser debugger is further to add a header field value of the current header field in the packet to the tracing data structure.

13. The computing device of claim 11, wherein the parser debugger is further to report the tracing data structure to a controller in response to parser monitoring being active.

14. The computing device of claim 11, wherein the parser debugger is further to store a number of states traversed by the packet in the parser in the tracing data structure.

15. The computing device of claim 11, wherein the current state is one of a plurality of parser states in the parse graph that utilizes one of a plurality of unique identifiers to identify the current state from other states.

16. A control plane device in communication with a plurality of data plane nodes in a software defined networking (SDN) network, the control plane device to configure a parser debugger to enable tracing of parsing states of a parser for debugging the parser, the control plane device comprising:

a computer readable storage medium having stored therein a parser debugger controller or analyzer; and a processor coupled to the computer readable storage medium, in which the processor is to execute the parser debugger controller or analyzer for the parser debugger controller or analyzer to send configuration information to the parser debugger, wherein the parser debugger performs operation to:

initialize a tracing data structure to record states of the parser as debugging information related to the parser during parsing of a packet, in order to track states of a parse graph that are traversed during processing of the packet:

initialize the parser to start in an initial state and recording in the tracing data structure;

add a current state of the parser to the tracing data structure to record the current state of the parser as a traversed state of the parser;

parse a current header field;

determine a next state of the parser based on the current header field to record the next state in the tracing data structure;

apply the packet to a packet processing pipeline when packet header processing completes; and send a report, including the tracing data structure having therein debugging information for the parser.

17. The control plane device of claim 16, wherein the parser debugger controller or analyzer to extract a header field value for each transitional state of the packet from the tracing data structure.

18. The control plane device of claim 16, wherein the parser debugger controller or analyzer is further to configure the parser to an active monitoring condition.

19. The control plane device of claim 16, wherein parser debugger controller or analyzer is further to extract a number of states traversed by the packet in the parser from the tracing data structure.

20. The control plane device of claim 16, wherein each state in the tracing data structure is identified by one of a plurality of unique identifiers related to the parse graph that the parser is configured to utilize.

* * * * *